UNITED STATES PATENT OFFICE.

CARL HOEDER, OF HAMBURG, GERMANY.

FUNNEL FOR PREPARING COFFEE.

SPECIFICATION forming part of Letters Patent No. 411,920, dated October 1, 1889.

Application filed August 23, 1889. Serial No. 321,716. (No model.) Patented in Germany February 2, 1889, No. 48,672; in France February 6, 1889, No. 195,916; in Belgium February 6, 1889, No. 84,913, and in Austria-Hungary May 20, 1889, No. 6,103 and No. 19,903.

*To all whom it may concern:*

Be it known that I, CARL HOEDER, a subject of the Emperor of Germany, residing at Hamburg, in the German Empire, have invented a new and Improved Funnel for Preparing Coffee, (for which I have obtained Patent No. 48,672 of the Empire of Germany, dated February 2, 1889; Patent No. 195,916 of the Republic of France, dated February 6, 1889; Patent No. 84,913 of the Kingdom of Belgium, dated February 6, 1889, and Patents Nos. 6,103 and 19,903 of Austria-Hungary, dated May 20, 1889,) of which the following is a specification.

The object of my improved coffee-funnel is to prepare coffee by shutting off the water, so as to prevent all loss of the fragrancy of the coffee and at the same time to effect an equal distribution of the water over the coffee by an indirect infusion of the former.

I will now proceed to describe my invention in reference to the drawings, and afterward point out its novelty in a claim.

Figure 1 of the drawings is a side view of the funnel in section. Fig. 2 is a plan view of the funnel, the left-hand half of which is represented in section on line $x\ x$. Figs. 3 and 4 are detail drawings of separate parts of the funnel.

A is the outer mantle of the funnel, which is provided at its lower part with a flange $m$, in order to enable it to be placed upon a suitable coffee-pot D, or a vessel for receiving the prepared coffee. Into the inner part of the funnel is placed upon a suitable support, as a ledge $i$, a tube B, which is open at the top and closed at the bottom, and which is connected at its lower end with a strainer H. After this tube and strainer are inserted the ground coffee is placed around B upon said strainer. Then another strainer P, provided with a central opening, is placed over the tube B. This strainer P rests upon a flange $o$ inside the mantle A and covers the coffee. Upon the upper edge of the mantle A is now placed the part shown by Fig. 3. This part consists of an infusion-vessel $e$, with an external flange $t$ to rest upon the mantle A, and a short tube $r$, which is inserted into the broader tube B. If hot water is poured upon $e$, the same fills at first the tube $r$ and the tube B, and then flows over the upper edge of B, in the direction of the arrows, and spreads over the strainer P, through the openings of which the water then reaches the coffee and macerates the same, which travels then through the strainer H into the receiving-vessel D.

The result will now be explained with reference to Fig. 1: An escape of the fragrancy is impossible during the preparation of the coffee, as the water in the tube B prevents all passage of air or gas through $r$ and $e$. The closing of $t$ at the edge of the mantle A, as well as the edge of the coffee-pot D, can be constructed sufficiently tight without difficulty to prevent an escape of the fragrancy. It can be seen at the same time that an indirect pouring over of the water takes place by the overflow of the water at B, in consequence of which the same reaches the coffee all over and without a sudden flow.

The mantle A is suitably provided with an outer handle $g$. At the lower part of the mantle, at $v$, a filter made of cloth or paper can be inserted to clear the coffee by filtering before it enters the coffee-pot.

What I claim as my invention is—

The funnel for preparing coffee, consisting of the combination of the outer mantle A, the strainer H in said mantle, the tube B, having a closed bottom above the strainer H, and the infusion-vessel $e$, having an attached tube $r$, and supported upon the mantle A, with said tube $r$ within the tube B, substantially as herein described.

CARL HOEDER.

Witnesses:
F. ENGEL,
A. SCHAPER.